HERBERT L. PAUSTIAN
Gilbert Urias,
INVENTORS

BY.
AGENT.

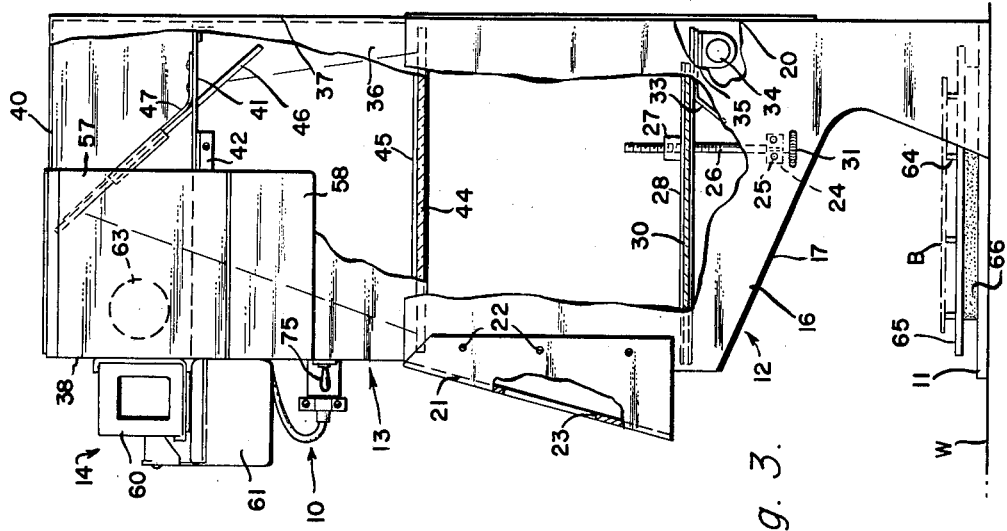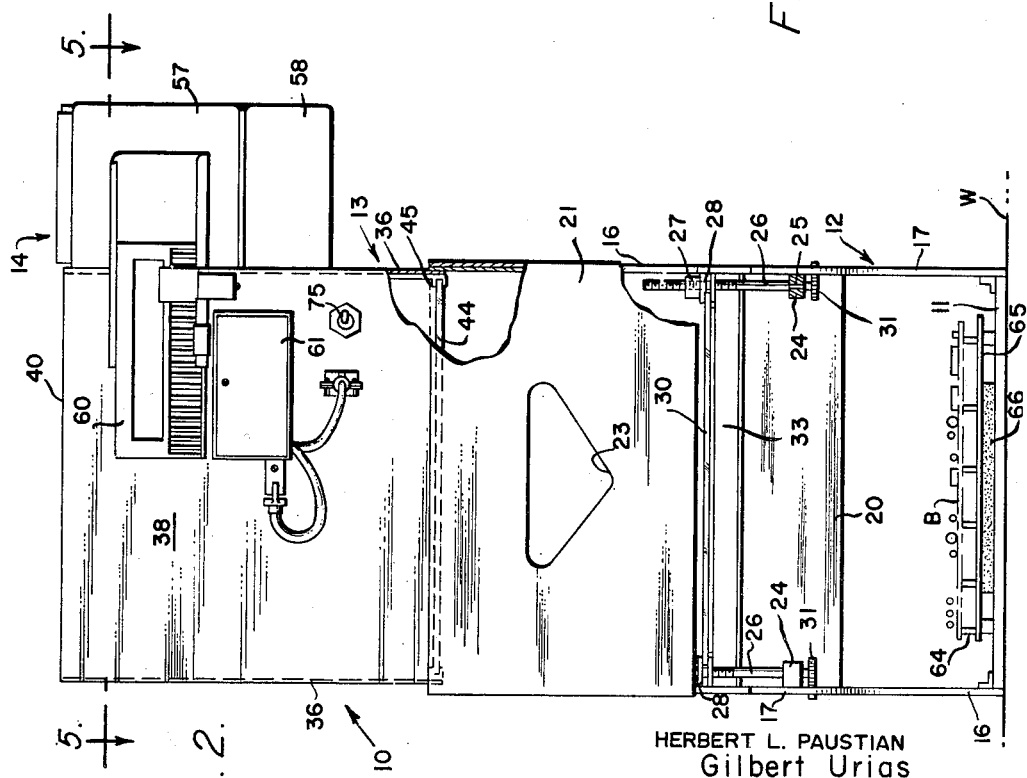

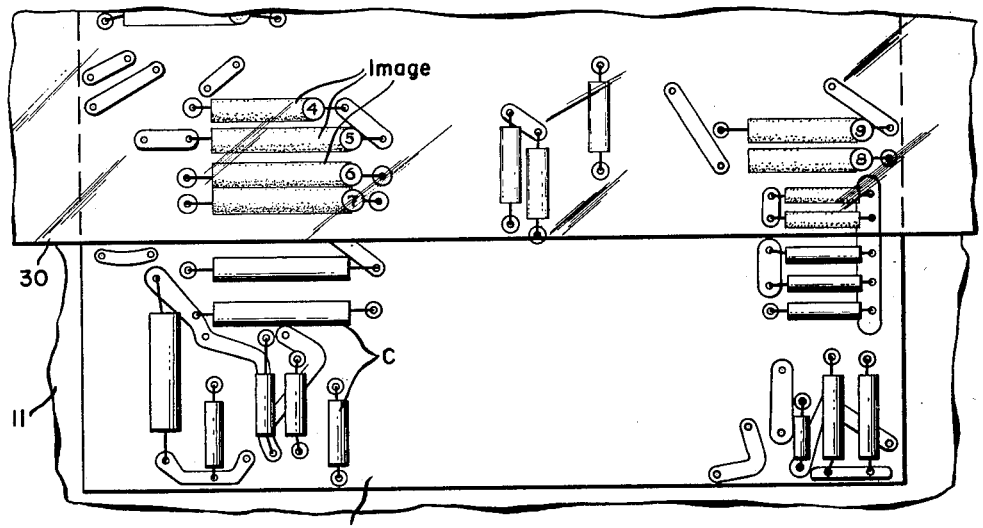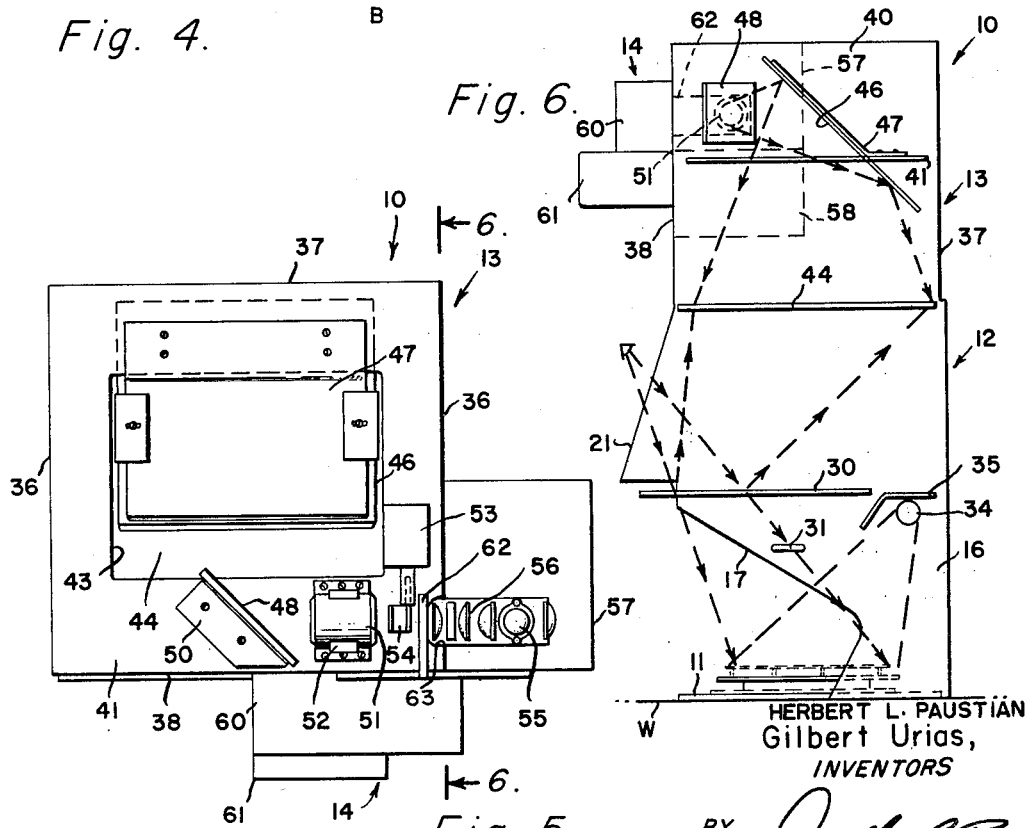

United States Patent Office

3,112,354
Patented Nov. 26, 1963

3,112,354
ARTICLE AND IMAGE COMPARING APPARATUS
Gilbert Urias, Tucson, Ariz., and Herbert L. Paustian, Canoga Park, Calif., assignors to Hughes Aircraft Company, Culver City, Calif., a corporation of Delaware
Filed July 1, 1960, Ser. No. 40,403
1 Claim. (Cl. 88—14)

The present invention relates generally to an article and image comparing apparatus and relates more particularly to an apparatus for comparing an image of an article with a replica of the article.

In manufacturing articles having a plurality of components and wherein the disposition, arrangement and selection of the components requires complex training and instructional material, it has been found desirable to enable a direct comparison between a photographed image of the article and all or a portion of a replica of the article. Additionally, an image of all or a portion of the article may also be compared with a completed replica thereof. Such comparisons are advantageous in the construction of articles such as printed circuit boards having numerous components thereon such as resistors, capacitors, transistors and the like. In such instances, the location and values of components may readily be established as an aid to inspection of a completed article or for locating and placing such components in their proper location on the circuit board. Devices of the present type are also useful as an educational and instructional tool in teaching such skills as writing, drawing, art, copying of symbols and objects and recognizing or forming different figures or foreign alphabets, for examples.

It has also been found that a visual comparison between an image of an article and a replica of the article may most advantageously be accomplished through a superimposition of the image in the line of sight extending to the replica of the article. Through disposition of the image in this manner, highly complex structures may be assembled or inspected with high degrees of efficiency, accuracy and speed. Such assembly has heretofore been accomplished through the use of specially prepared drawings, transparent overlays and/or written planning instructions. These former methods of assemblying complex structures require the operator to make many movements from one place to another, and improperly assembled articles were often the result of this practice. Through use of the device of the present invention, a considerable reduction in errors in the selection and placement of components on printed circuit boards and in the ultimate checking and inspection thereof have been achieved.

Prior devices intended for similar purposes and employing projectors and the like, have projected directly upon an object or surface on which work was being performed. In instances where drawings are being made and the object being worked upon is in the form of a sheet of paper or the like, such direct projection does not present a substantial problem; however, in instances where the object or article on which work is being accomplished is of a contoured, rough or multiplane character, such direct projection is impractical, the projected image is difficult to distinguish and the procedure is fraught with many other problems. Accordingly, the disposition of an aerial or apparently floating image of all or a portion of the article in the line of sight extending to a replica of the article enables a clear comparison therebetween and an ability to distinguish various portions thereof, even though such portions may be relatively small and arranged in a composite of many components.

It is therefore one important object of the present invention to provide an article and image comparing apparatus wherein a semi-transparent image of the article is disposed in the line of sight extending to a replica of the article.

It is another object of the invention to provide an apparatus for enabling a visual comparison between an image of an article and a replica of the article and wherein the image appears to be spaced from the replica.

It is a still further important object of the invention to provide an article and image comparing apparatus having a projection system and arrangement of components to establish an image of all or a portion of an article in spaced relationship to a replica of the article.

A still further important object of the invention is to provide an article and image comparing apparatus including a projector, a mirror projection system and a screen, means being provided for simultaneously viewing the screen and a replica of the article.

Another object of the invention is to provide an article and image comparing apparatus including means for adjustably positioning the image and/or a replica of the article and establishing visual register or deliberate misalignment thereof.

Other and further important objects of the invention will become apparent from the disclosures in the following detailed specification, appended claim and accompanying drawings, wherein:

FIG. 2 is an enlarged front elevational view of the present apparatus, partially broken away for clarity;

FIG. 3 is a side elevational view of the apparatus, also broken away for clarity;

FIG. 4 is an enlarged fragmentary view showing a representation of the article and image as seen by the operator;

FIG. 5 is a partially diagrammatic top view of the projection system for the present apparatus and taken substantially as indicated by line 5—5, FIG. 2;

FIG. 6 is a diagrammatic view showing the complete projection and viewing system of the present apparatus and taken substantially as indicated by line 6—6, FIG. 5.

Figures 1, 7:
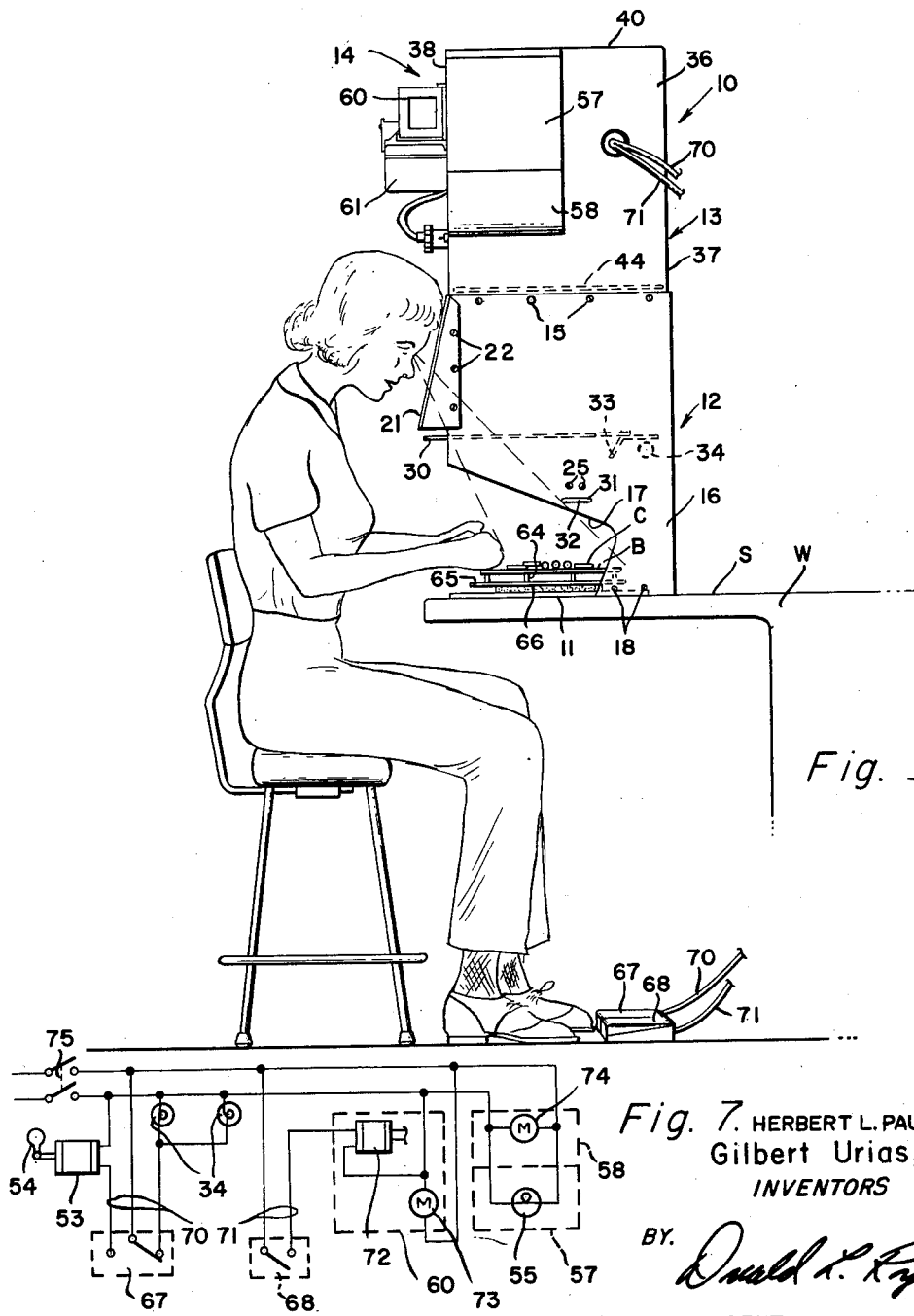
FIGURE 1 is a side elevational view of the present article and image comparing apparatus shown in conjunction with a work table and an operator.
FIG. 7 is a schematic wiring diagram for the present apparatus.

With reference to the drawings and with reference primarily to FIG. 1, the article and image comparing apparatus of this invention is shown as indicated generally at 10. As shown, the apparatus is generally rectangular, vertically disposed and has a planar base member 11 that is adapted for disposition upon and support by a surface S of a work table or the like, indicated at W.

In general, the present apparatus includes a lower or viewing portion 12, a projection portion 13 and a slide projector and changer 14. The upper or projection portion 13 is telescopically disposed in and secured to the lower or viewing portion 12 as by suitable fasteners 15.

As shown in FIGS. 1, 2 and 3, the viewing portion 12 includes vertically disposed side members 16 that are cut away as at 17 and secured to the base member 11 as by suitable fasteners 18. The portion 12 is also provided with a rear panel 20 that is secured to the side members 16 and a hood or shield 21 that is angularly disposed and secured to the forward edge of the side members 16 as by suitable fasteners 22. A forward area of the portion 12 below the shield 21 is open to provide access to the base member 11. The shield 21 is provided with a central viewing opening 23, an upper edge of the shield 21 being substantially coextensive with an upper edge of the side members 16.

The side members 16 of the viewing portion 12 have a pair of journal blocks 24 that are laterally aligned and secured to inner surfaces thereof as by fastening members 25. The blocks 24 serve rotatably to support through reduced diameter portions, threaded shafts 26, the threaded portions of which engage nuts 27. The nuts 27 are carried by and secured to strip members 28 that serve to support a semi-transparent mirror 30. The arrangement of the strip members 28 is such as to enclose opposite side edges of the mirror 30 and to provide a support for the mirror. The lower ends of the shafts 26 are provided with enlarged heads 31, the peripheral portions of which extend through suitable openings 32 in the side members 16 to enable rotation thereof together with the shafts 26. Upon rotation of the shafts 26, the mirror 30 may be raised or lowered as desired. The mirror 30 is also horizontally slidably retained by the strip members 28, whereby to permit the mirror to be horizontally positioned beneath a lower edge of the shield 21 for a purpose to be hereinafter more fully described.

The strip members 28, forming the supports for the mirror 30, serve also to support a transversely disposed light shield 33 that is positioned adjacent the rear panel 20 and in the form of an angle member that surrounds bulbs 34 carried by suitable sockets 35. The bulbs 34 serve to illuminate the area of the base member 11 intermediate the side members 16, also for a purpose to be hereinafter more fully described.

The projection portion 13 includes side members 36, a rear panel 37, a front panel 38 and a top panel 40. Additionally, a transversely disposed partition 41 is disposed within the projection portion 13 and supported on suitable brackets 42 that are secured to the side, front and rear walls respectively. As shown in FIG. 5, the partition 41 serves also as a mask and has a central generally rectangular opening 43 therein.

As shown in FIGS. 2 and 3, the projection portion 13 serves to support a transversely disposed screen 44 in the lower end thereof. The screen 44 is carried by a suitable bracket 45 disposed from the side members 36 of the portion 13 and is positioned horizontally and parallel to the mirror 30 and the base member 11. The screen 44 has a ground surface thereon and is adapted for a downward presentation of an image that is rear projected thereupon.

As shown, the partition 41 serves to support a mirror 46 that is carried by a bracket 47 that is in turn secured to an upper surface of the partition. The mirror 46 is disposed at substantially 45° with respect to the partition 41 and the screen 44, and has a lower portion disposed through the opening 43 in the partition 41. The partition 41 also serves to support another angularly disposed mirror 48 that is secured to a bracket 50 carried by the upper surface of the partition 41. As shown in FIG. 5, a projection lens 51 is carried by a support 52 that is secured to the partition 41. The partition 41 further serves to support a solenoid 53 that is operatively connected to a shutter 54 that is disposed in the projection axis adjacent the lens 51 and remote from the mirror 48, the purpose of which to be later described.

The slide projector 14 includes a projection system including a projection bulb 55 and a lens system 56 enclosed within a housing 57. A housing 58, positioned below the housing 57, serves to support a suitable cooling blower (not shown). The projector further includes a slide changer and carrier 60 having facilities for a plurality of slides, and a solenoid operated motor driven slide changer 61. Transparencies, in the form of slides carried by the changer and carrier 60, are adapted for selective disposition intermediate the lens 51 and the lens system 56 by means of a carrier 62. The particular projector, slide carrier, changer and cooling blower arrangement, and the details thereof, form no particular part of the present invention and are illustrated by way of example only. Other means may be provided for disposing an image carrying transparency between the projection lens 51 and the lens system 56 without departing from the spirit and scope hereof. The particular projector and changer mechanism illustrated may be of the type commonly manufactured and sold by the Argus Manufacturing Company. A suitable opening 63 is provided in one of the side members 36 of the projection portion 13 to admit collimated light from the projector into the interior of the portion 13.

As shown primarily in FIGS. 2 and 3, a printed circuit board or the like is indicated at B and shown by way of reference. The board B is adapted to support a plurality of electrical components shown in FIG. 4 at C. The board B is temporarily supported on suitable support members 64 that are mounted on a plate 65. The plate 65 has strips of resilient material such as sponge rubber 66 secured to a lower surface thereof and is adapted to rest upon an upper surface of the base member 11. It may thus be seen that the board B, together with the plate 65, may be moved to any desired location on the base member 11 and may also be moved slightly in a vertical direction upon application of force to the plate 65 in a direction to compress the resilient material 66.

With reference to FIGS. 1 and 7, a pair of foot switches 67 and 68 are positioned beneath the work table W and connected by means of cables 70 and 71 to the comparing apparatus. The switches 67 and 68 are thus positioned for easy operation by an operator. The switch 67 is an alternating switch serving, upon first operation, to energize the bulbs 34 and, upon second operation, to energize the solenoid 53, to interpose the shutter 54 in the path of light from the projector lens system 56. The switch 68, upon operation, serves to energize a solenoid 72 that forms a portion of the slide changing mechanism 60, whereby to dispose a new slide from the slide carrier between the lens 51 and the lens system 56. A slide changing motor 73 is continuously operated. A motor 74, which serves to operate the cooling blower generally described hereinbefore, also operates continuously, as well as the projection bulb 55. A master switch 75 is provided for all of the electrical elements of the present apparatus and may be suitably mounted, as shown, in the front panel 38 of the projection portion 13.

With specific reference to the semi-transparent mirror 30, this mirror is of the half-silvered type, and it has been found that a reflectivity of 70% to 80% best serves the purpose intended. Mirrors of this type are semi-transparent in the direction of the most light and have a characteristic of reducing light transmission therethrough. When the bulbs 34 are illuminated, an operator viewing the upper surface of the mirror 30 through the opening 23 in the shield 21 may see through the mirror 30 and view the board B positioned on the plate 65 carried by the base member 11. The operator may also see a reflection on the mirror 30 of an image that is rear projected on the screen 44 by way of a path from the projection lens 51 to the mirror 48, to the mirror 46 and onto the screen 44.

In use of the present apparatus, the slide carrier and changer 60 is loaded with a plurality of transparencies in the form of slides having images of all or portions of a replica of an article being assembled on and forming a portion of the board B. These images may include identified numbers or other data and may represent specific components or groups of components C that are being assembled on or inspected in relation to the board B. The operator will thus see an image that is substantially as indicated in FIG. 4 with the image of the article or portion of the article appearing to be on the mirror 30 and, upon illumination of the bulbs 34, may also see the board B and components carried thereby. A visual comparison may thus be made between the article image on the mirror 30 and the replica thereof, in the form of the board B and the components C carried thereby. The plate 65 may be moved as desired on the base 11 to orient the image appearing on the mirror 30 with the structure of the board B and the components thereon. The mirror 30 may also be moved horizontally to the position shown in FIG. 1, if desired. The mirror 30 may also be adjusted vertically to change the over-all size of the image for accurate alignment and comparison with the board B. Upon operation of the foot switch 67, the operator may also alternately view either the board B along through the mirror 30 or the board B, together with the floating image apppearing on the mirror 30. By depressing the plate 65 and compressing the resilient material 66, the board B may be moved slightly out of register with the image on the mirror 30, whereby to permit a clear view of either the image or the components C as desired and clearly to differentiate therebetween. In the event the present apparatus is being used as an assembly aid for the components C on the board B, the various slides are suitably organized and sequenced to enable the most efficient selection of components and assembly techniques. These slides may be changed when desired through use of the foot switch 68. The slides may also be programmed through use of any suitable commercially available time delay mechanism, operating in conjunction with the automatic changer, to present individual images for predetermined periods of time. Such an arrangement is advantageous when the present apparatus is used as an inspection aid to check the existence and proper location of components C on the board B.

Having thus described the invention and the present embodiment thereof, it is desired to emphasize the fact that many modifications may be resorted to in a manner limited only by a just interpretation of the following claim.

We claim:

Apparatus for facilitating comparison of an electrical circuit component board with a photographic reproduction of a model component board comprising: a horizontally movable work surface; a compressible resilient support for said work surface to enable said work surface to be momentarily depressed; a housing enclosing and extending substantially vertically above said work surface and provided with an access opening adjacent said work surface; a photographic slide projector associated with the upper portion of said housing and having an electrically controllable slide changer, said slide projector being adapted to project an image of a photographic reproduction of a model component board; an electrically controllable shutter disposed adjacent said projector and positioned to controllably interrupt said image of a model component board; a translucent screen disposed within said housing intermediate said slide projector and said work surface and positioned substantially parallel to and vertically above said work surface; a mirror system within said housing intermediate said projector and said screen and adapted to reflect said image of a model component board onto an upwardly directed surface of said screen; a semitransparent mirror disposed within said housing substantially parallel to and intermediate said screen and said work surface; electrically controllable illumination means positioned in said housing intermediate said mirror and said work surface and shielded from said mirror and adapted to illuminate said work surface; said housing having a viewing opening intermediate said screen and said mirror through which is visible an upwardly directed surface of said mirror, a reflection of said image of a model component board projected onto said screen being visible in said mirror, and said work surface being visible through said mirror; screw means mounted within said housing and engaging said mirror for vertically adjustably positioning said mirror to permit registration of said image of a model component board; a first foot treadle-operated electrical control associated with said housing and connected to said shutter and to said illumination means for alternate control of visibility of said image of a model component board and said work surface; and a second foot treadle-operated electrical control associated with said housing and connected to said automatic slide projector for control of slide changing; horizontal movement of said work surface permitting registration of said image of a model component board; depression of said work surface permitting deliberate momentary misalignment of said image of a model component board for comparison purposes.

References Cited in the file of this patent
UNITED STATES PATENTS

| | | |
|---|---|---|
| 1,361,143 | Daniel | Dec. 7, 1920 |
| 2,079,508 | Kaplowitz | May 4, 1937 |
| 2,111,198 | Vice | Mar. 15, 1938 |
| 2,336,508 | Smith et al. | Dec. 14, 1943 |
| 2,423,370 | Butscher | July 1, 1947 |
| 2,729,141 | Walker | Jan. 3, 1956 |
| 2,805,471 | Lowden | Sept. 10, 1957 |
| 2,807,190 | Oldenboom | Sept. 24, 1957 |
| 2,906,016 | Cannon et al. | Sept. 29, 1959 |
| 3,029,692 | Mulch | Apr. 17, 1962 |

FOREIGN PATENTS

| | | |
|---|---|---|
| 462,373 | Canada | Jan. 10, 1950 |